(12) United States Patent
Watanabe et al.

(10) Patent No.: US 6,175,366 B1
(45) Date of Patent: Jan. 16, 2001

(54) METHOD FOR DISPLAYING AND CONTROLLING PLURAL CHARACTERS OPERATED BY A PLAYER ON A VIDEO GAME APPARATUS

(75) Inventors: Yasushi Watanabe; Junichi Tsuchiya; Takatoshi Katahata; Katsumoto Tatsukawa, all of Tokyo (JP)

(73) Assignee: Sega Enterprises Ltd., Tokyo (JP)

(*) Notice: Under 35 U.S.C. 154(b), the term of this patent shall be extended for 0 days.

(21) Appl. No.: 09/095,582

(22) Filed: Jun. 11, 1998

(30) Foreign Application Priority Data

Jun. 17, 1997 (JP) .................................................. 9-159700

(51) Int. Cl.[7] .................................................. G06T 15/40
(52) U.S. Cl. ........................ 345/422; 345/473; 345/474; 463/6; 463/7; 463/33; 463/34
(58) Field of Search .................................. 345/421, 427, 345/473, 474, 422; 463/6, 7, 33, 34

(56) References Cited

U.S. PATENT DOCUMENTS 5,816,913 * 10/1998 Nakamura ............................... 463/6
5,830,066 * 11/1998 Golden et al. ........................ 463/33
5,963,218 * 10/1999 Naka et al. ........................... 345/474

* cited by examiner

*Primary Examiner*—Mark Zimmerman
*Assistant Examiner*—Kimbinh T. Nguyen
(74) *Attorney, Agent, or Firm*—Dickstein Shapiro Morin & Oshinsky LLP (57) ABSTRACT

In a video game on which plural players operate different characters, a method for displaying and controlling a character makes players not lose their interest to continue a video game even when a difference according to the player's technique is generated. The method for displaying and controlling the plural characters, includes the steps of judging a condition operated by a player for one of the first and second characters to be displayed according to a game program, and controlling a displayed position for the one of the first and second characters according to the judging result; and loosing the condition of the judgement for the one of the first and second characters when a virtual distance between the first and second characters is more than a predetermined value according to the game program.

17 Claims, 7 Drawing Sheets

METHOD FOR DISPLAYING AND CONTROLLING PLURAL CHARACTERS OPERATED BY A PLAYER ON A VIDEO GAME APPARATUS

BACKGROUND OF THE INVENTION

1. Field of the Invention

The present invention relates to a method for displaying and controlling plural characters operated by players on a video game apparatus, and it further relates to a video game apparatus using the method.

2. Description of the Related Art

Virtual sports which plural players compete by operating each of plural characters to be displayed by a video game apparatus have become popular.

In such the video game apparatus, a video image is displayed on a display device, the video image being obtained by projecting to a two dimensional plain, a virtual space image as observed from a camera positioned at a view point in a virtual space. A player operates with an input device such as an input pad, an object or character of the video image displayed on the display device, motion of the character being subject to the player's operation, and a controller in the video game apparatus judges whether or not the operation by the player clears specific check items.

Then, the controller controls to vary a running speed or display position of the character on the picture screen of the display device according to degree of clearing the check items. When the player succeeds in making the character achieve a predetermined goal, or gets a predetermined count of points, the player wins the game, and the game is finished.

In this case, the player's technique generally reflects on a displayed position of the character, on the picture screen of the display device, operated by the player. Therefore, if a difference between the techniques of players becomes larger than a predetermined value, it becomes difficult to concurrently display characters operated by the players who have different techniques on the same picture screen. For example, a character operated by one player is controlled as moving faster than the other operated by the other player, and therefore, only one character is displayed on a picture screen.

Accordingly, the other character operated by the other player having an inferior technique is disappeared from the picture screen. Thereby, the other player cannot know how he should operate the character disappeared from the picture screen. As the result, the one player who operates the one character which is displayed on the picture screen can gain advantage to the other player who operates the disappeared character, unilaterally.

This brings the result of making the player lose his interest in continuing the game and make the game program itself boring.

SUMMARY OF THE INVENTION

Accordingly, it is an object of the present invention to provide a method for displaying and controlling characters to overcome the shortcomings of in the conventional methods.

It is another object of the present invention to provide a method for displaying and controlling characters without losing the player's interest even when a difference according to the player's technique is generated on a video game in which each of plural players respectively operates each character.

It is a further object of the present invention to provide a method for displaying and controlling characters which should be displayed in a picture screen of a display device, in which one or more characters selected from a group of the plural characters to be subject to a displaying operation are not displayed in the picture screen with a predetermined rule, i.e., the characters are removed from the picture screen.

It is a further object of the present invention to provide a video game apparatus employing the above-described method for displaying and controlling characters.

Other objects of the present invention will become apparent from the description of explaining embodiments according to the attached drawings.

According to the invention, the above-described objects are achieved in a video game apparatus for executing a game by operating each of plural characters to be displayed, including by a method for displaying and controlling first and second characters on a game apparatus includes the steps of judging a condition operated by a player for one of the first and second characters to be displayed executed by a player according to a game program, controlling a displayed position for the first and second characters according to the judging result, and loosing the condition of the judgement for a first and second characters when a virtual distance between the first and second characters is more than a predetermined value according to the game program.

In the method, it is further possible to control such that a virtual distance of which value is more than the predetermined value is used as a first distance, and a virtual distance larger than the first distance is used as a second distance, and when the virtual distance between the first and second characters becomes more than the first distance, a view point for displaying the first and second characters on a picture screen is moved to a point from a back of the second character positioned after the first character.

In the method, it is also possible to control such that when the virtual distance between the first and second characters is more than the second distance, only the first character is displayed on the picture screen.

According to the present invention, the above-described objects are achieved by a video game apparatus for executing a game by operating each of plural characters to be displayed, which includes a storage medium storing a game program, and a controller for judging a condition operated by a player for one of the first and second characters to be displayed according to the game program, controlling a displayed position for the one of the first and second characters according to the judging result and loosing the condition of the judgement for the one of the first and second characters when a virtual distance between the first and second characters is more than a predetermined value according to the program.

Alternatively, in the video game apparatus for displaying image pictures of plural characters positioned in a virtual space, controlled by the player's operations and captured from a predetermined view point, a method for displaying and controlling plural characters, includes the steps of judging a condition operated by a player for one of the plural characters to be displayed executed by plurality players, varying a predetermined view point so as to remove, at least, one character from the plural characters to be subject to each operations of the plural players from a picture screen according to the predetermined condition to be judged.

Further, in the method for displaying and controlling plural characters, a same motion for each of the plural characters is controlled by a same operation of the player.

Moreover, the picture screen is single.

In the method, the predetermined condition to be judged is based on a distance between at least one character and the other character selected from the plural characters.

Additionally, in the method, a process for removing, at least, one of the plural characters from the picture screen is executed while receiving operations inputted by players.

In the method, an operation different from the operation for the displayed characters is executed for the character removed from the picture screen or another different operation is added for the removed character.

DESCRIPTION OF THE PREFERRED EMBODIMENTS

Embodiments according to the present invention will be now explained in accordance with the attached drawings. Throughout the following descriptions, the same reference numerals and symbols are used to denote and identify corresponding or identical components.

Figure 1:
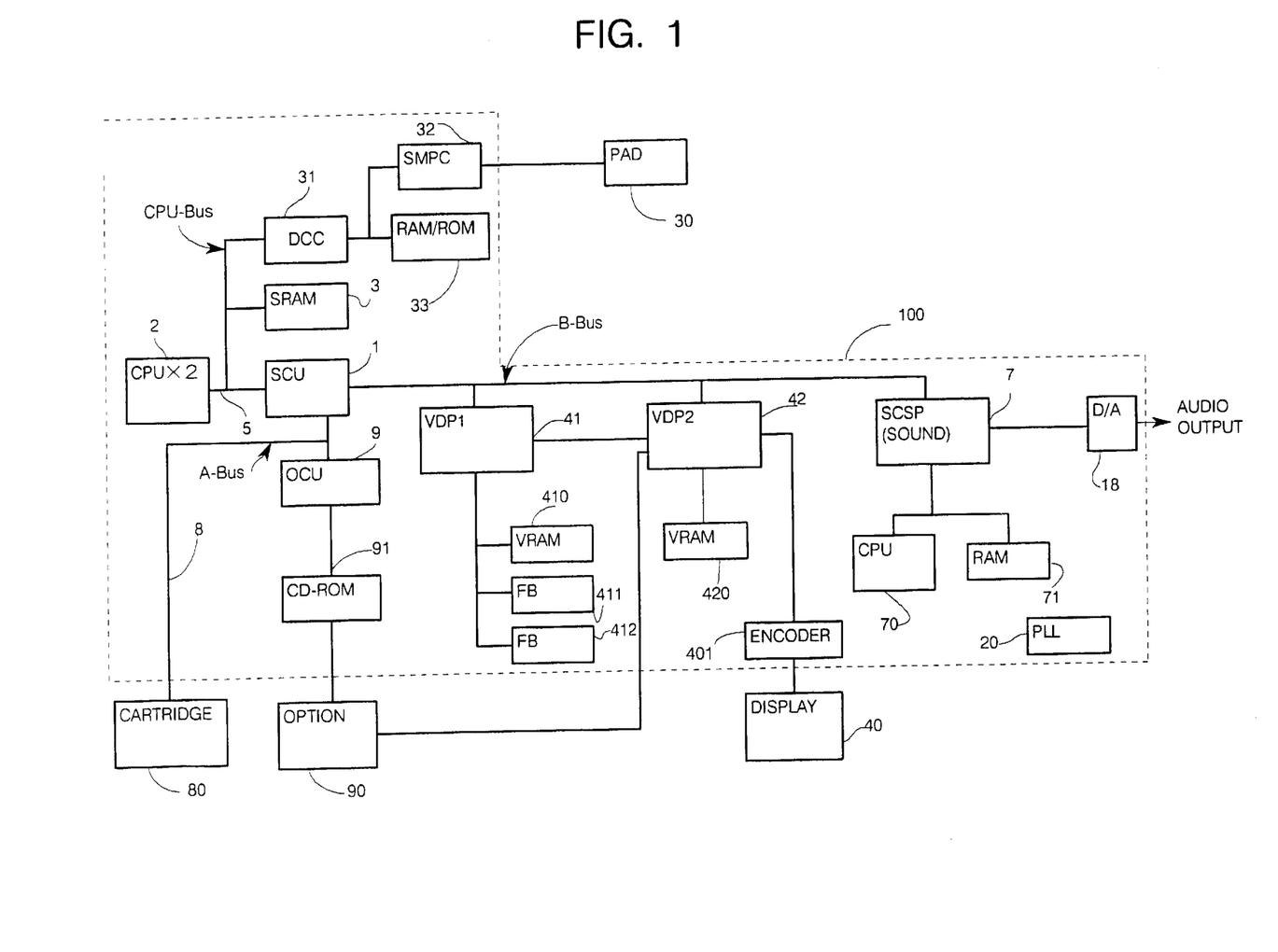
FIG. 1 is a block diagram of a video game apparatus for explaining an embodiment of the present invention.

FIG. 1 is a block diagram of a video game apparatus for explaining an embodiment according to the present invention. A video game apparatus 100 is illustrated in an area surrounded by a broken line of FIG. 1. A main CPU 2 including a pair of high-speed CPUs controls the entire system. A synchronous DRAM 3 is a work RAM employed by main CPU 2.

A system controller 1 has a function for controlling to send and receive data between a first bus CPU-BUS 5, a second bus (A-BUS) 8 and a third bus (B-BUS) 6, and plays a roll of a co-processor for the main CPU 2.

The system controller 1 includes first and second video display processors (VDP) 41 and 42. The first VDP 41 is a processor for executing to control forms and motions of polygons when forming and displaying a sprite, i.e., a character controlled by a player and background image with plural polygons, or for controlling to vary the size of the polygons according to program data sent under the control of the main CPU 2.

According to the method for displaying and controlling characters of the present invention described later in detail, the first VDP 41 also executes processes for enlarging or varying a displayed position or displayed angle of polygon data to display the character based on a virtual view point.

A video RAM 410 is connected to the first VDP 41. Video RAM 410 is a memory for storing control commands and character data processed in the first VDP 41. These control commands and character data correspond to displayed images and are included in the program data sent under the control of the main CPU 2.

Frame buffer memories (FB) 411 and 412 are further connected to the first VDP 41. Frame buffer memories (FB) 411 and 412 consist of duplex frame buffers, and while data for a next picture frame is written into one frame buffer memory, data for the current picture frame is read out from the other frame buffer memory.

The second VDP 42 maps a texture, controls a scroll surface and determines priority for displaying each polygon according to depth data of each polygon. A video RAM 420 is connected to the second VDP 42. Video RAM 420 is a memory for storing a scroll map, a bit map and coefficient data.

Main CPU 2 and synchronous DRAM 3 are connected to the system controller 1 through the first bus (CPU-BUS) 5. On the other hand, the first and second VDPs 41 and 42 are connected to the system controller 1 through the third bus (B-BUS) 6.

CPU controller 31 connected to the first bus (CPU-BUS) 5 arbitrates the first bus (CPU-BUS) 5 when the high-speed CPU 2 of a pair of CPUs, accesses the synchronous DRAM 3 and the system controller 1.

CPU controller 31 further manages the control when CPU 2 accesses I/O controller 32 and RAM/ROM 33. The control pad 30 removably connected to the external section of the video game apparatus 100 is operated by a player.

Further, ROM cartridge 80 connected to second bus (A-BUS) 8 is a memory which is removably connected to the external section of the video game apparatus 100 to store a game program executed and controlled by the main CPU 2. Second bus (A-BUS) 8 has the same bus size as the third bus (B-BUS) 6.

A CD-ROM drive 91 and a functional block used as an optional device for generating an external picture signal formed by a standard, such as the moving picture expert group i.e., MPEG, are further connected through an optical disk control unit 9 to the second bus (A-BUS) 8.

An encoder 401 converts an analog RGB signal outputted from the second VDP 42 to a video signal. The video signal converted by the encoder 401 is displayed on a display device 40.

A sound processor 7 is further connected to the third bus (B-BUS) 6 to control generating PCM/FM sound sources. A CPU 70 for sound and a RAM 71 for work in the CPU 70 are connected to the sound processor 7, and voice source processing is controlled by the CPU 70.

A D/A converter 18 is further connected to the sound processor 7 to obtain an audio output by converting a digital sound source to an analog signal. A PLL circuit 20 generates a basic clock supplied to the whole system.

A method for controlling plural characters according to the present invention to be realized in the video game apparatus shown in FIG. 1 will be now explained.

Although a slalom ski game will be explained as one example, the present invention is not restricted to this. It is applicable to a video game by which, at least, plural characters are displayed and a player operates a character, or plural players operate each of the characters.

Figure 2:
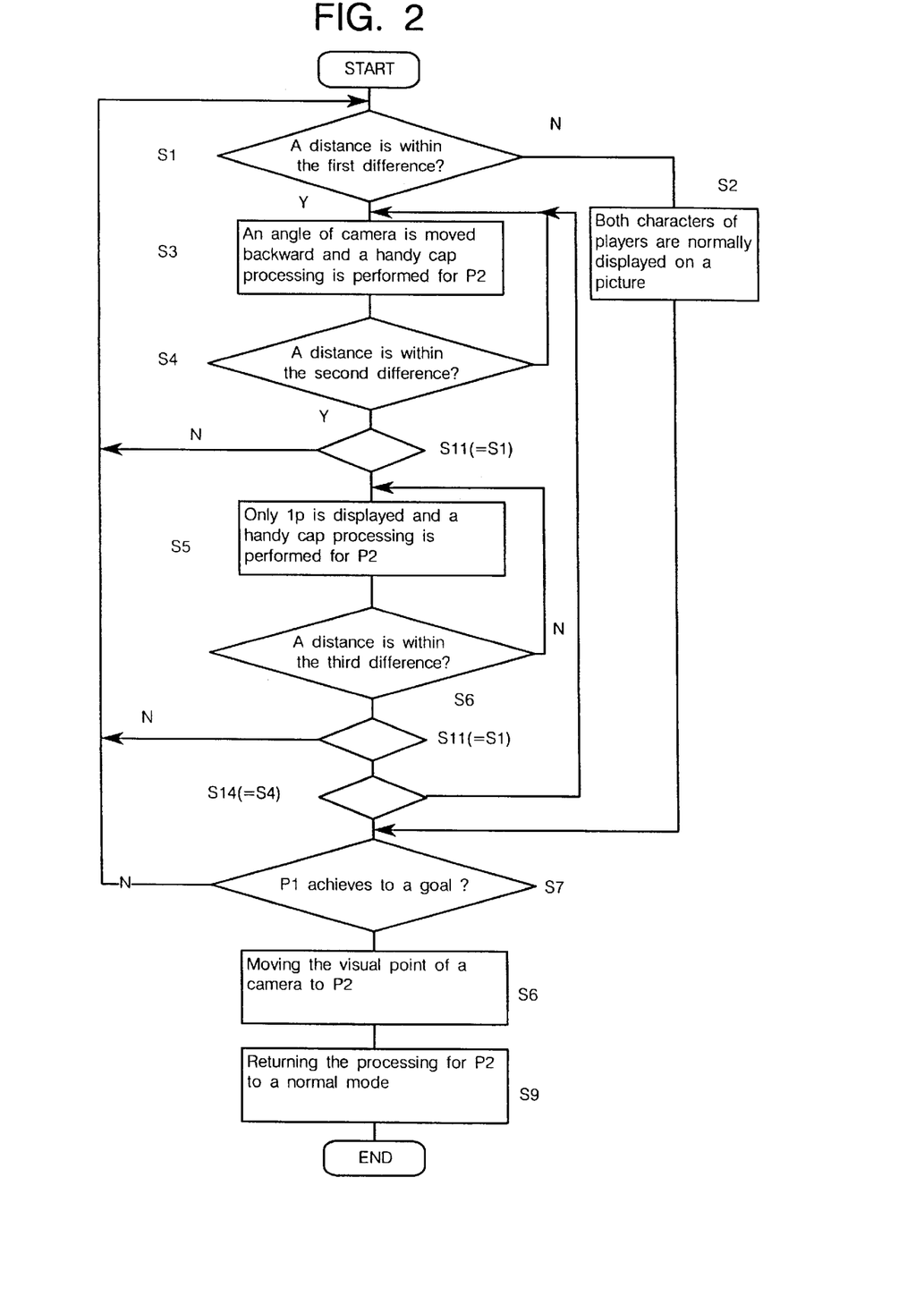
FIG. 2 illustrates an operational flow chart of a method for displaying and controlling a character according to the present invention.

FIG. 2 is an operational flow chart of the method for displaying and controlling characters according to the present invention. When the main CPU 2, which is used as a control means, reads a game program stored in ROM cartridge 80 or CD-ROM provided in CD-ROM drive 91 and executes it, operations corresponding to the operational flow chart shown in FIG. 2 are executed.

In the slalom ski game, a first skier 1P competes with a second skier 2P in speed. Motions of the characters of the skiers 1P and 2P are respectively operated by players through the input pad 30.

The players operate to let the displayed skiers spring poles positioned along a progressive direction subsequently and ski ahead. Then, CPU 2 calculates a range for controlling progressive speeds of the skiers, and a camera angle for displaying the skiers, i.e., a view point of a camera in a virtual space according to the condition of the operations for the skiers operated by the players under the control of the game program. Then, CPU 2 sends the result to the video RAM 410 attached to the first VDP 41.

First VDP 41 converts coordinates of and changes magnification of plural polygons for forming characters' appearances corresponding to the moving speed of a corresponding characters and a picture screen observed from the view point of the camera.

The formed polygon data is sent to the second VDP 42, and the polygon data is stored in the video RAM 420 according to priorities for display. Then, the polygon data is subsequently sent and displayed in the display device 40 through the encoder 401 to form a picture screen according to the game progression.

In FIG. 2, it is judged whether or not a distance between the first skier 1P and second skier 2P is more than a first distance (STEP S1). In here, the distance is, when considered as a virtual space on the game, a difference between coordinate values of two polygons selected from the plural polygons forming characters of the first and second skiers 1P and 2P.

At step S1, if the difference is within the first distance, for example, 10 m, both players, i.e., characters of the first and second skiers 1P and 2P are displayed on a picture screen of the display device 40 (STEP S2).

Figure 4:
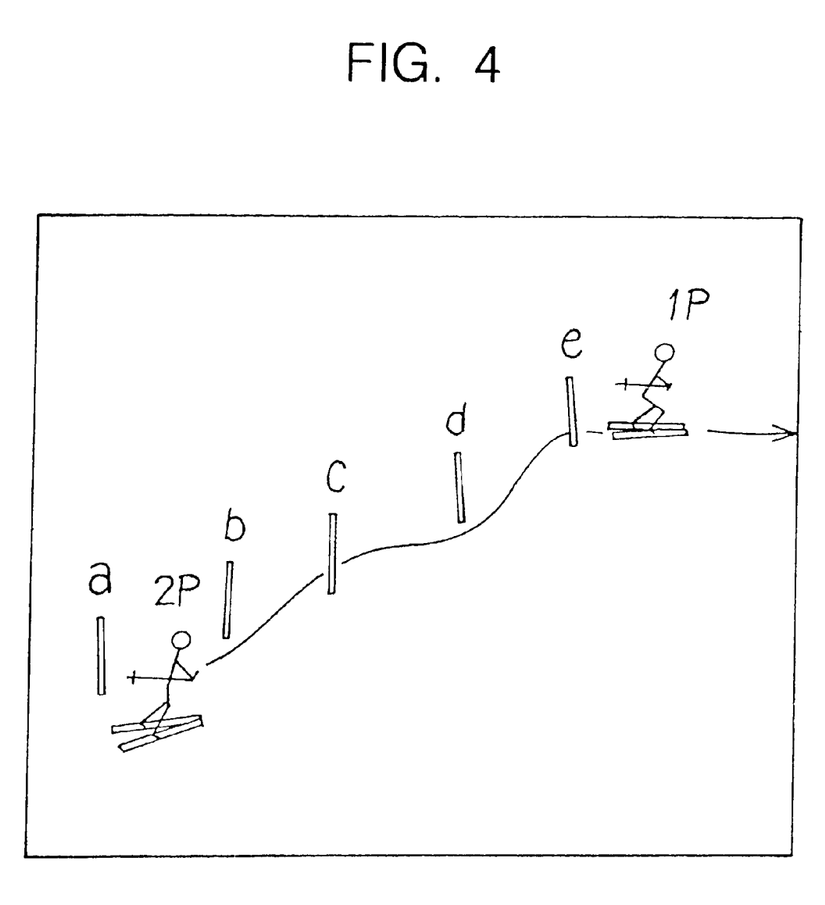
FIG. 4 is a first example of a picture screen.

The picture screen at this time is, for example, as shown in FIG. 4. In FIG. 4, poles a to e are shown. The players operate the skiers 1P and 2P so as to ski well springing these poles.

Figure 3A:
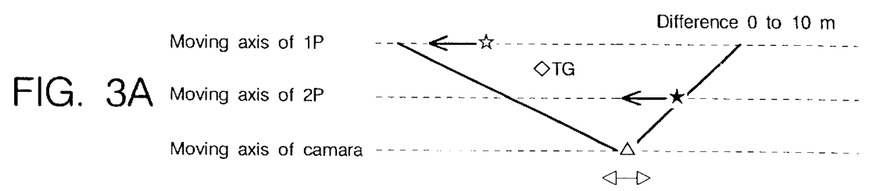
FIGS. 3A to 3D explains relationships between an axis for moving a first skier 1P, an axis for moving a second skier 2P, an axis for moving a vertical camera and coverage angle of the virtual camera.

In here, to form the picture screen shown in FIG. 4, motion axes of the first and second skiers and the virtual camera are considered as shown in FIGS. 3A to 3 D. An angle of the view of the virtual camera is controlled to face toward a target TG.

In FIG. 3A, both the skiers 1P and 2P are displayed in a picture screen of the display device 40. The skiers 1P and 2P respectively move along each motion axes toward directions of arrows. The camera moves to both directions.

The picture screen of FIG. 4 is an example in the relation of FIG. 3A.

Returning back to FIG. 2, at step S1, if the difference is more than the first distance, an angle of the camera is moved backward and a handy cap processing is performed for the second skier 2P.

Figure 3B:
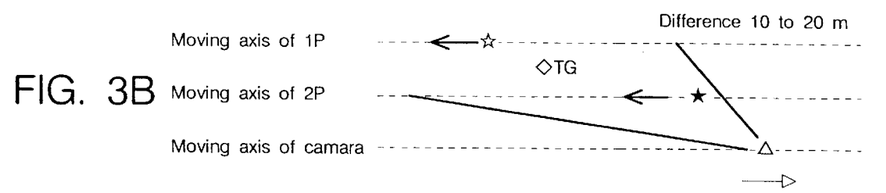
Figure 3C:
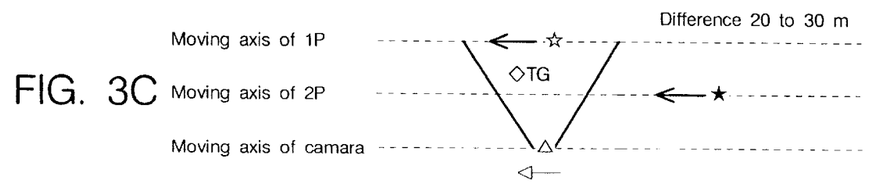
Figure 5:
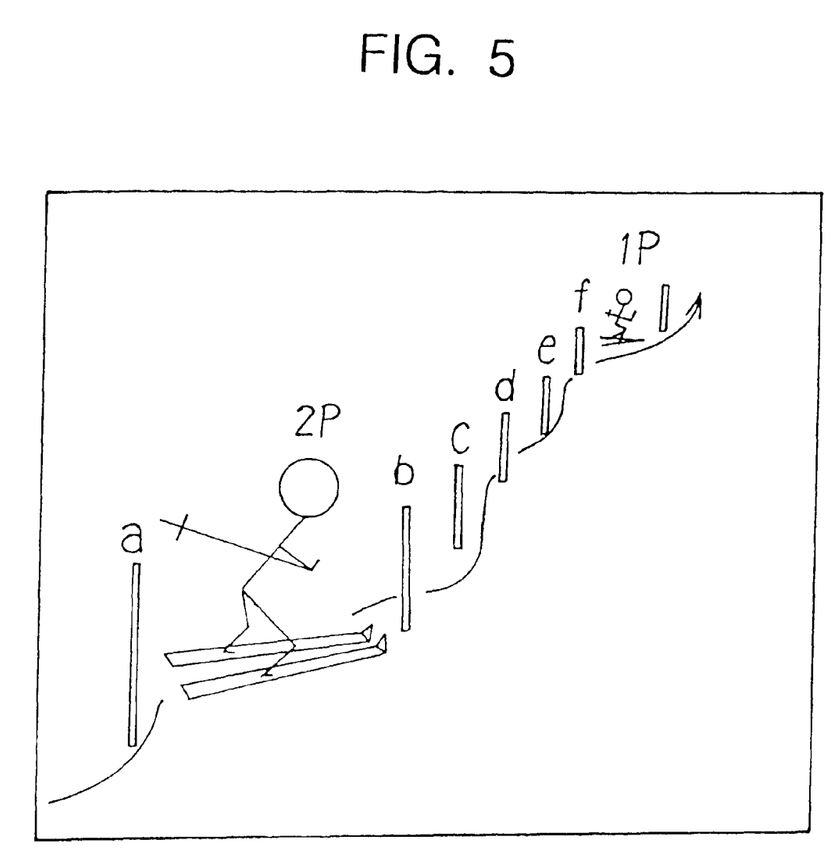
FIG. 5 is a second example of a picture screen.

The process for moving the angle of the camera backward is, for example, to move a position of the camera backward as shown in FIG. 3B within a range between the distances from 10 m to 20 m. The picture screen at this time is, for example, as shown in FIG. 5. On the other hand, the handy cap processing for the second skier 2P is, for example, to switch so as to loose the judgement of hit checks executed by the main CPU 2 illustrated in the following table 1:

TABLE 1

| Hit Check | bad <----------------> good | | |
|---|---|---|---|
| Normal | not sprung | sprung | well-sprung |
| loosen | sprung | well-sprung | well-sprung |

That is, the main CPU 2 classifies and estimates condition where a skier springs poles in three grades, such as "well-sprung", "sprung", and "not sprung", according to condition where the player contacts the poles, in the above-described table 1. When the difference between the first and second skiers 1P and 2P is less than the first distance, the main CPU 2 normally estimates the first and second skiers 1P and 2P commonly in the three grades.

At step S1, when the difference between the first and second skiers 1P and 2P is more than the first distance, the CPU 2 estimates the second skier 2P without the grade of "not-sprung" as illustrated in the table 1. Accordingly, the second skier 2P becomes more advantageous to the first skier 1P on the hit check.

In here, the more the hit check condition is better the more the program controls to accelerate the skiers 1P and 2P faster. Therefore, as the skier 2P is in the advantage condition on the hit check, it becomes possible to reduce the difference of distance to the skier 1P, and therefore, it becomes possible to return to the condition such that displayed as shown in FIG. 4.

Additionally, as another embodiment, the system enables the player to use a specific input operation which can not be used when a character is displayed on a picture screen, when the character is disappeared from the picture screen, instead of the method for changing the estimation standard by a game program as described above, or as an additional function. For example, such an additional function can be added as doubling the speed of the character of a skier for skiing by pressing a specific input key which can not be used while the character is displayed on a picture screen at a predetermined interval, when the character is disappeared from the picture screen.

Then, when the skier 2P is further delayed from the condition of FIG. 5, the appearance of the skier 10 is displayed too small. Thereby, it now becomes difficult for the player to operate the skier 1P.

Figure 6:
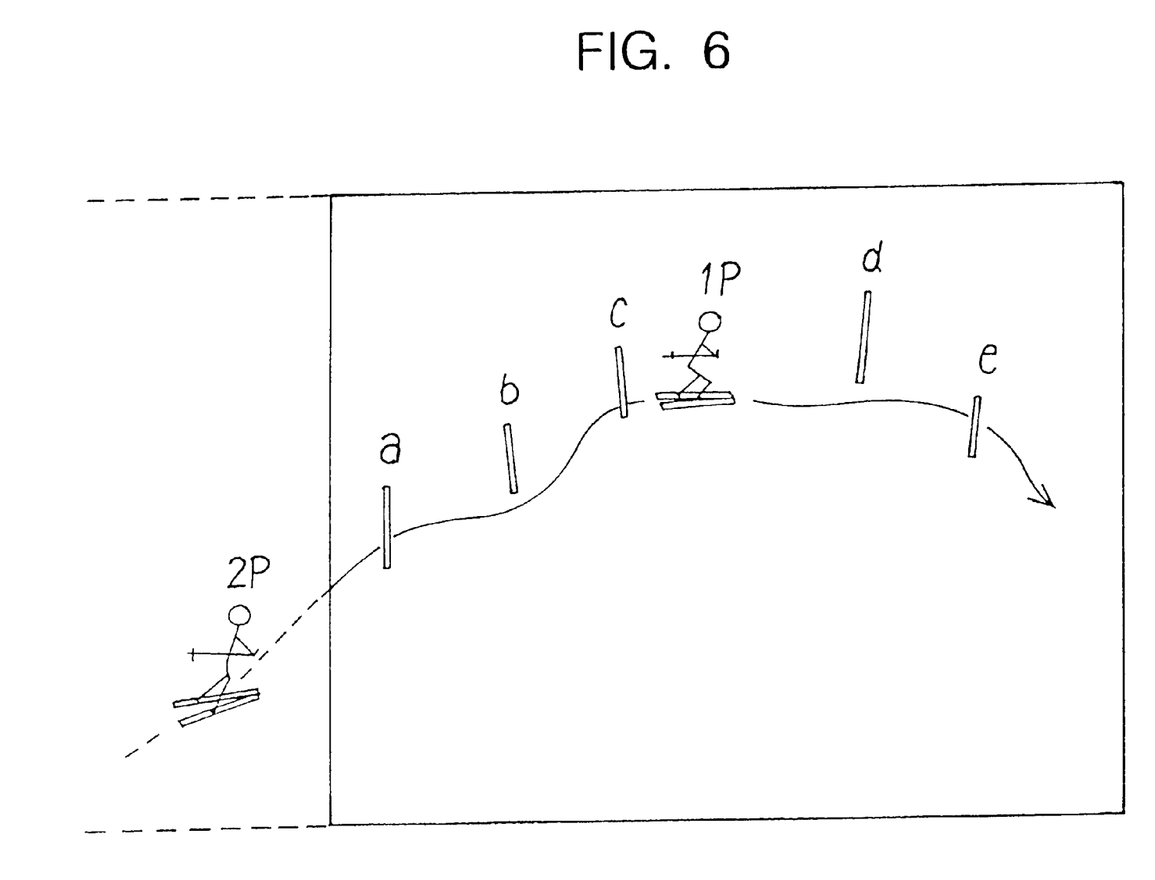
FIG. 6 is a third example of a picture screen.

Therefore, in FIG. 2, when the difference is more than a second distance, for example, 20 m, the picture screen becomes as shown in FIG. 6 until the difference is increased to 30 m (STEP S5). That is, as shown FIG. 3C, the camera changes its position as to focus the skier 1P as a target. In this case, the picture of the skier 2P is out from the picture screen. Concurrently, the above-described handy cap processing is executed for the skier 2P.

In this case, when the player operates the skier 1P well, the difference of distance between the both skiers becomes larger. Then, the CPU 2 judges whether or not the difference is more than a third distance, for example, 30 m (STEP S6).

Figure 3D:
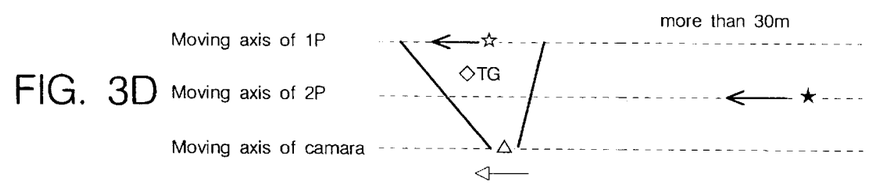
Figure 7:
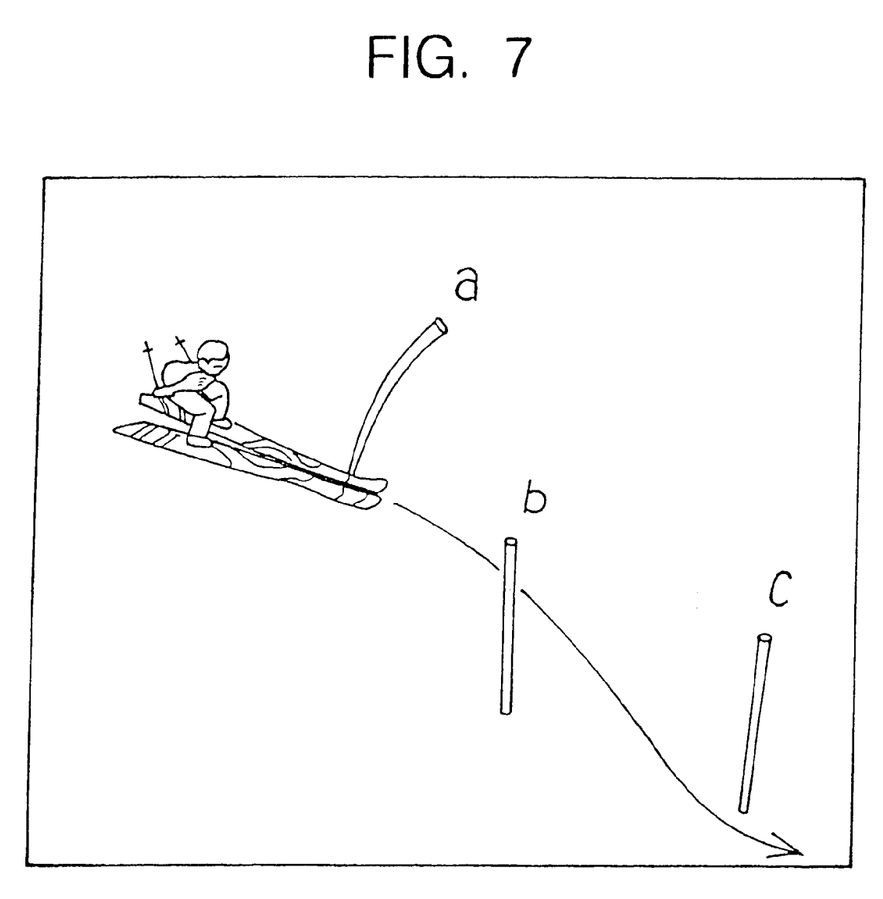
FIG. 7 is a fourth example of a picture screen.

When the difference of distance is more than 30 m, the picture screen becomes as shown in FIG. 7 as only the skier 1P is focused as shown in FIG. 3D, until the skier 1P is achieved to the goal.

For better understanding the above-described relationships, it can be illustrated in the following table 2:

| Difference (m) | Motion | Camera target | Camera position | Hit check |
|---|---|---|---|---|
| ① 0~10 | Displaying both skiers fairly | Center of both skiers | Center of both skiers as a standard | Both skiers are normal |
| ② ~20 | Displaying the delayed skier so as not to be out of a picture | Closing a target toward the winner side from center of the both skiers. With a difference of 20 m, a point of ¾ between both skiers. | Moving a camera backward. With a difference of 20 m, maximum position. | Loosing hit check of the delayed player for one grade |
| ③ ~30 | Giving up to display the loser and closing the picture toward the winner | Closing a target toward the winner side from center of the both players. With a difference of 30 m, the target is only the winner | Closing the camera forward so as to trigger the winner as a standard from maximum position | Losing hit check of the delayed player for one grade |
| ④ more than 30 | Displaying only the winner | only the winner | locating camera according to only the winner as a standard. | Loosing hit check of the delayed player for one grade |

After the skier 1P has reached the goal, it is also possible to move the view point of the camera to the second skier 2P (STEP S8) and return the hit check for the skier 2P to a normal mode to continue the game (STEP S9).

Further, in the operational flow chart shown in FIG. 2, the steps S11 and S14 are processes when the difference of distance between the skiers 1P and P2 exceeds more than the first distance (at step S1) or the second distance (at step S4) at once, and the difference is reduced again. These steps are respectively corresponding to the steps S1 and S4.

Although a slalom ski game is explained as one example on the above-described explanation, the present invention is not restricted to the example, and it is matter of course to be applicable to other games, such as an automatic car race game.

Additionally, although the processes are explained with respect to the distance between two characters on the above-described embodiment, the present invention is not restricted to this, and it is easy to apply displaying and controlling more than two characters, similarly.

For instance, it is also possible to execute processes similarly to those of the above-described embodiment by dividing plural characters more than two characters into two groups, or to display and control a headed character and the remaining characters respectively as corresponding to the first and second skiers 1P and 2P of the above-described example.

As explained in detail, according to the present invention, on a video game in which plural characters are displayed, it is possible to concurrently display plural characters on a same picture screen as much as possible by giving advantage to a character having inferior condition. Therefore, it becomes possible to continue the game without turning the scale against the character having inferior condition, unilaterally and losing the player's interest.

On the other hand, as the system does not increase a degree of difficulty in playing the game carelessly by keeping a winning character away from a virtual camera and reducing the size of a displayed character, there is no possibility to let the player who operates the winning character to lose his interest in the game.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for displaying and controlling first and second characters on a game apparatus, comprising the steps of:

judging a condition operated by a player for one of the first and second characters to be displayed according to a game program;

controlling a displayed position for the one of the first and second characters according to the judging result; and loosening the condition of said judging step for the one of the first and second characters when a virtual distance between the first and second characters is more than a predetermined value according to the game program, wherein the loosened condition allows the game to continue and provides a playing advantage to the one of the first and second characters.

2. The method according to claim 1, wherein a virtual distance having a value larger than the predetermined value is used as a first distance, and a virtual distance larger than the first distance is used as a second distance, and when the first character is positioned ahead of the second character by a virtual distance larger than the first distance, a view point for displaying the first and second characters on a picture screen is moved to a back of the second character.

3. The method according to claim 2, wherein when the first character is positioned ahead of the second character by a virtual distance more than the second distance, only the first character is displayed on the picture screen.

4. A video game apparatus for executing a game by operating first and second characters to be displayed, comprising:

a storage medium storing a game program; and a controller for judging a condition operated by a player for one of the first and second characters to be displayed according to the game program, controlling a displayed position for the one of the first and second characters according to the judging result, and loosening the condition for the one of the first and second characters when a virtual distance between the first and second characters is more than a predetermined value according to the game program, wherein the loosened condition allows the game to continue and provides a playing advantage to the one of the first and second characters.

5. The video game apparatus according to claim 4, wherein a virtual distance having a value larger than the predetermined value is used as a first distance, and a virtual distance larger than the first distance is used as a second distance, and when the first character is positioned ahead of the second character by a virtual distance larger than the first distance, a view point for displaying the first and second characters on a picture screen is moved to a back of the second character.

6. The video game apparatus according to claim 5, wherein when the first character is positioned ahead of the second character by a virtual distance more than the second distance, only the first character is displayed on the picture screen.

7. A video game apparatus, comprising:

a memory storing a game program; and a controller for controlling operation of a plurality of characters and displaying the plurality of characters according to the game program, wherein the controller judges a condition operated by a player for a first character of the plurality of characters and controls a displayed position for the first character according to the result of the judgement, and when the first character is positioned ahead of a second character by a virtual distance that is more than a predetermined value, the controller loosens a second condition of a second judgement for the second character wherein the loosened second condition allows the game to continue and provides a playing advantage to the second character.

8. The video game apparatus according to claim 7, wherein a virtual distance having a value larger than the predetermined value is used as a first distance, and a virtual distance larger than the first distance is used as a second distance, and when the first character is positioned ahead of the second character by a virtual distance larger than the first distance, a view point for displaying the first and second characters on a picture screen is moved to a back of the second character.

9. The video game apparatus according to claim 8, wherein when the first character is positioned ahead of the second character by a virtual distance more than the second distance, only the first character is displayed on the picture screen.

10. A method for displaying and controlling plural characters on a video game apparatus during a game, comprising the steps of:

judging a condition operated by a player for one of the plural characters to be displayed according to a game program;

removing the display of at least one of the plural characters from a picture screen when the condition of said judging step exceeds a predetermined condition; and continuing the game and providing a playing advantage to at least one of the plural characters.

11. The method according to claim 10, wherein a same motion for each of the plural characters is controlled by a same operation of the player.

12. The method according to claim 10, wherein the picture screen is single.

13. The method according to claim 10, wherein the predetermined condition to be judged is based on a distance between at least one character and the other character selected from the plural characters.

14. The method according to claim 10, wherein a process for removing the at least one of the plural characters from the picture screen is executed while receiving operations inputted by players.

15. The method according to claim 11, wherein an operation different from the operation for the displayed characters is executed for the character removed from the picture screen or another different operation is added for the removed character.

16. The method according to claim 1, wherein when the virtual distance becomes between the first and second character becomes so large that of one of the first and second characters is no longer displayed, the loosened condition provides the playing advantage to the other one of the first and second characters.

17. The video game apparatus according to claim 4, wherein when the virtual distance becomes between the first and second character becomes so large that of one of the first and second characters is no longer displayed, the loosened condition provides the playing advantage to the other one of the first and second characters.

* * * * *